US011999610B2

(12) United States Patent
Schulz-Hildebrandt et al.

(10) Patent No.: US 11,999,610 B2
(45) Date of Patent: Jun. 4, 2024

(54) FILLING VALVE WITH LEAKAGE PROTECTION DEVICE

(71) Applicant: ELAFLEX HIBY GmbH & Co. KG, Hamburg (DE)

(72) Inventors: Lasse Schulz-Hildebrandt, Neumünster (DE); Sebastian Viets, Moisburg (DE)

(73) Assignee: ELAFLEX HIBY GMBH & CO. KG, Hamburg (DE)

( * ) Notice: Subject to any disclaimer, the term of this patent is extended or adjusted under 35 U.S.C. 154(b) by 0 days.

(21) Appl. No.: 18/102,219

(22) Filed: Jan. 27, 2023

(65) Prior Publication Data

US 2023/0174367 A1 Jun. 8, 2023

Related U.S. Application Data

(63) Continuation of application No. 17/780,153, filed as application No. PCT/EP2020/082515 on Nov. 18, 2020, now Pat. No. 11,603,309.

(30) Foreign Application Priority Data

Nov. 29, 2019 (EP) .................................... 19212605

(51) Int. Cl.
*B67D 7/54* (2010.01)
*B67D 7/48* (2010.01)

(52) U.S. Cl.
CPC .................................... *B67D 7/54* (2013.01); *B67D 7/48* (2013.01)

(58) Field of Classification Search
CPC .................................... B67D 7/54; B67D 7/48
See application file for complete search history.

(56) References Cited

U.S. PATENT DOCUMENTS 2,138,380 A * 11/1938 Killman .................. B67D 7/48 141/215
2,343,903 A * 3/1944 Hammand ............... B67D 7/48 141/225

(Continued)

FOREIGN PATENT DOCUMENTS

CN 200940089 8/2007
CN 102320548 1/2012

(Continued)

OTHER PUBLICATIONS

International Search Report, International Patent Application No. PCT/EP2020/082515, dated Mar. 31, 2021, 3 pages.

*Primary Examiner* — Bob Zadeh
(74) *Attorney, Agent, or Firm* — Casimir Jones, S.C.; Brian F. Bradley

(57) ABSTRACT

The invention relates to a filling valve for dispensing a fluid, comprising an inlet opening for connecting to a fluid supply line, an outlet end (12) which lies opposite the inlet opening, a main valve for controlling the flow of the fluid through the filling valve, and a leakage protection valve (13) which is arranged downstream of the main valve, comprising a valve seat (14) and a valve body (15, 16) which can be moved into a closed position in an upstream direction. According to the invention, the valve body (15, 16) has a first sub-body (15) and a second sub-body (16) which is designed to be movable relative to the first sub-body, wherein a first fluid path (17) can be released by a movement of the first sub-body (15) in a downstream direction relative to the valve seat (14), and a second fluid path (18) can be released by a movement of the second sub-body (16) in a downstream direction relative to the first sub-body (15). By virtue of the two-part valve body according to the invention, the flow of fluid through the filling valve can be optimized and the back pressure accu- (Continued)

mulating in front of the leakage protection valve can be reduced.

6 Claims, 5 Drawing Sheets

(56) References Cited

U.S. PATENT DOCUMENTS

| | | | | | |
|---|---|---|---|---|---|
| 2,818,889 | A * | 1/1958 | Krause | B67D 7/48 | 141/225 |
| 2,874,735 | A * | 2/1959 | Boone | B67D 7/48 | 141/225 |
| 3,341,075 | A * | 9/1967 | Boudot | B67D 7/48 | 141/225 |
| 3,521,679 | A * | 7/1970 | Copony | B67D 7/48 | 141/208 |
| 3,653,415 | A | 4/1972 | Boudot | | |
| 3,823,752 | A | 7/1974 | Lasater | | |
| 3,994,323 | A * | 11/1976 | Takahata | B67D 7/48 | 141/392 |
| 4,258,760 | A * | 3/1981 | Moore | B67D 7/48 | 141/206 |
| 4,796,678 | A | 1/1989 | Motohashi | | |
| 4,809,753 | A * | 3/1989 | Fink, Jr. | B67D 7/42 | 141/206 |
| 5,078,188 | A * | 1/1992 | Nitzberg | B67D 7/48 | 141/192 |
| 5,474,115 | A * | 12/1995 | Fink, Jr. | B67D 7/52 | 141/DIG. 1 |
| 5,562,133 | A * | 10/1996 | Mitchell | B67D 7/54 | 141/DIG. 1 |
| 5,603,364 | A | 2/1997 | Kerssies | | |
| 5,967,385 | A * | 10/1999 | Coates, III | B67D 7/48 | 141/206 |
| 6,311,742 | B1 | 11/2001 | Nusen | | |
| 6,851,628 | B1 * | 2/2005 | Garrison | B67D 7/48 | 239/525 |
| 6,951,229 | B2 * | 10/2005 | Garrison | B67D 7/44 | 141/206 |
| 8,167,003 | B1 * | 5/2012 | Clever | B67D 7/54 | 141/214 |
| 9,126,820 | B2 | 9/2015 | Gray | | |
| 10,669,149 | B2 * | 6/2020 | Gray | B67D 7/04 | |
| 2006/0130903 | A1 | 6/2006 | Whittaker | | |
| 2009/0250123 | A1 | 10/2009 | Matsubara | | |
| 2010/0090138 | A1 | 4/2010 | Bromley | | |
| 2011/0219860 | A1 * | 9/2011 | Tumarkin | B67D 7/44 | 222/566 |
| 2011/0272063 | A1 * | 11/2011 | Tumarkin | B67D 7/42 | 141/387 |
| 2011/0277880 | A1 | 11/2011 | Meyer | | |
| 2014/0048173 | A1 * | 2/2014 | Fedde | B67D 7/02 | 141/311 A |
| 2014/0224838 | A1 * | 8/2014 | Gray | B67D 7/3209 | 222/108 |
| 2015/0210446 | A1 | 7/2015 | Wilkins et al. | | |
| 2016/0096720 | A1 | 4/2016 | Worley et al. | | |

FOREIGN PATENT DOCUMENTS

| | | | | |
|---|---|---|---|---|
| CN | 102588632 | | 7/2012 | |
| CN | 103663339 | | 3/2014 | |
| CN | 105668490 | | 6/2016 | |
| CN | 106224625 | | 12/2016 | |
| CN | 205773290 | | 12/2016 | |
| CN | 107001022 | | 8/2017 | |
| CN | 107399706 | | 11/2017 | |
| CN | 107857228 | | 3/2018 | |
| DE | 1072902 | | 1/1960 | |
| DE | 19521199 | A1 * | 12/1996 | B60K 15/04 |
| DE | 102015217606 | A1 * | 3/2017 | B60K 13/04 |
| EP | 1275613 | A1 * | 1/2003 | B67D 7/32 |
| EP | 2386520 | | 11/2011 | |
| EP | 2687479 | | 1/2014 | |
| GB | 857822 | A * | 1/1961 | B67D 7/48 |
| GB | 1103397 | | 2/1968 | |
| JP | 2007145336 | | 6/2007 | |
| WO | WO-9928143 | A1 * | 6/1999 | B60K 15/03519 |
| WO | 2014021124 | | 2/2014 | |
| WO | 2018175793 | | 9/2018 | |

* cited by examiner

FILLING VALVE WITH LEAKAGE PROTECTION DEVICE

This application is a continuation of U.S. patent application Ser. No. 17/780,153, filed May 27, 2022, which is a 371 National Entry Application of PCT/EP2020/082515, filed Nov. 18, 2020, which claims priority to expired EP Patent Application Ser. No. 19212605.0, filed Nov. 29, 2019, the contents of which are herein incorporated by reference in their entireties.

The present invention relates to a filling nozzle for dispensing a fluid. The filling nozzle comprises an inlet opening for connection to a fluid feed line, an outlet end situated opposite the inlet opening, a main valve for controlling a fluid flow through the filling nozzle, and a discharge protection valve arranged downstream of the main valve. The outlet protection valve comprises a valve seat and a valve body which is movable upstream into a closed position.

When fluids are dispensed by means of such a filling nozzle, it is normally the case that, after a dispensing process has ended, in particular after the closure of the main valve, residual quantities of the fluid remain within the filling nozzle. In particular for fluids of high viscosity, a considerable quantity of the fluid can adhere to the inner walls of the filling nozzle. If the filling nozzle is inclined downwardly on the discharge side, said residual quantities can run out, which is often undesirable. For the purpose of preventing discharge of the remaining residual quantities of fluid, it is known to provide a discharge protection valve (see for example EP 2 687 479 A1). Here, the discharge protection valve is normally designed such that, when the main valve is opened, said discharge protection valve is opened by the pressure of the fluid stream.

One problem in the prior art is that, with an open main valve, the fluid stream through the discharge protection valve is impeded. In particular, a high back pressure and undesirable swirling can occur at the discharge protection valve. Against this background, it is the object of the present invention to provide a filling nozzle with which the problems known from the prior art occur to a less considerable extent.

Said object is achieved by the features of the independent claims. Advantageous embodiments are described in the dependent claims. According to the invention, the valve body has a first part-body and a second part-body, which is configured to be movable relative to the first one. By way of a downstream-directed movement of the first part-body relative to the valve seat, a first fluid path is able to be opened up. By way of a downstream-directed movement of the second part-body relative to the first part-body, a second fluid path is able to be opened up.

Firstly, some expressions used in the context of the present description will be explained. The discharge protection valve serves for preventing discharge of residual quantities of the fluid which, after closure of the main valve, remain in the filling nozzle downstream of the main valve. The valve body of the discharge protection valve can, for this purpose, be held in the closed position by means of a holding force which is large enough to prevent discharge of the residual quantities. However, the holding force is generally so small that an opening pressure generated by the fluid stream when the main valve is open is sufficient to open the discharge protection valve.

The filling nozzle is preferably configured for dispensing liquids, in particular fuels, such as for example petrol or diesel. The terms “upstream” and “downstream” used in the context of the description relate to the main flow direction of the fluid, which main flow direction is oriented from the inlet opening to the outlet end.

The fact that the discharge protection valve according to the invention has a first part-body and a second part-body which is movable downstream relative thereto means that the fluid stream can pass through the discharge protection valve in a more uniform and more stable manner, wherein moreover, the back pressure before the discharge protection valve is reduced.

In the context of the invention, it has been recognized that, in the prior art, a high back pressure is often built up before the discharge protection valve, in particular at large through-flow rates, which subjects the components within the filling nozzle to intense mechanical loading and reduces the achievable flow through the filling nozzle. Due to the second part-body according to the invention, which is configured to be movable relative to the first part-body, it is possible for there to be opened up not only the first fluid path, which is opened by way of the movement of the first part-body relative to the valve seat, but also a second fluid path, which makes possible an additional flow through the discharge protection valve. Here, the second part-body can be moved relative to the first part-body, likewise by way of the opening pressure generated by the fluid stream after the main valve is opened. In this way, the fluid stream passing through the filling nozzle can be divided between the first fluid path and the second fluid path, which leads overall to improved flow dynamics with an increased throughput and lower back pressure before the discharge protection valve. The first fluid path can in this case pass, in particular at the outside, an inlet-side end of the first part-body, wherein the second fluid path can pass the inlet-side end of the first part-body at the inside.

In a preferred embodiment, the first part-body has at least one passage opening for the second fluid path, wherein the passage opening is able to be opened up by way of the movement of the second part-body relative to the first part-body. Via the passage opening, the flow guided past the first part-body at the inside can be merged with the flow guided therealong at the outside, which leads to a further improvement of the flow dynamics.

Furthermore, the second part-body may have a sealing surface for abutment against a counterpart sealing surface of the first part-body, wherein the counterpart sealing surface preferably forms a part-body valve seat for the first part-body. The passage opening of the first part-body may in this case be situated in particular downstream of the counterpart sealing surface when the discharge protection valve is in the closed position. The sealing surface and the counterpart sealing surface make it possible to ensure that the discharge protection valve is reliably closed off in the closed position and that the residual quantities of fluid are thus reliably prevented from running out.

In a preferred embodiment, the sealing surface of the second part-body and the counterpart sealing surface of the first part-body are at an angle of between 60° and 120°, preferably between 80° and 100°, to an axial direction of the discharge protection valve. More preferably, the sealing surface of the second part-body and the counterpart sealing surface of the first part-body are substantially perpendicular to the axial direction of the discharge protection valve. If the axial direction of the discharge protection valve is substantially perpendicular to the sealing surfaces, good sealing action can be achieved in a simple manner. The sealing surface and counterpart sealing surface may moreover preferably be configured in such a way that, in the closed position of the discharge protection valve, they bear against one another in a substantially planar manner.

It is advantageous if the second part-body has a circumferential surface which, in the closed position of the discharge protection valve, is radially completely surrounded by the first part-body. The second part-body may be arranged in particular concentrically with respect to the first part-body. In this way, the second part-body can be securely guided within the first part-body, wherein, in the closed position, the counterpart sealing surface of the first part-body can bear against the sealing surface of the second part-body over its entire circumference.

Preferably, the second part-body, proceeding from the sealing surface, narrows in cross section towards the inlet-side end. It has been found that, in this way, a further improvement of the throughflow properties can be achieved. In particular, an outer surface of the second part-body may have in the region of the narrowing a first portion and a second portion, which is arranged upstream of the first one, wherein the first portion is outwardly bulged and the second portion is inwardly bulged. This bulging makes it possible to avoid swirling in the second fluid path, in particular with the flow past the sealing surface, whereby the throughflow can be further improved and the back pressure can be further reduced.

In a preferred embodiment, at least one of the part-bodies may be guided with sliding action relative to the valve seat by means of a linear guide, wherein the linear guide preferably has a shank which extends in an axial direction of the discharge protection valve and which is guided with sliding action through a passage opening of the second part-body. The passage opening may extend centrally along an axial direction of the second part-body. Moreover, the second part-body may be rotationally symmetrical relative to its axial direction.

The linear guide may alternatively or additionally have a registration opening, preferably extending in an axial direction of the discharge protection valve, which is arranged rigidly relative to the valve seat and through which a guide limb of the part-body is guided with sliding action. Furthermore, one of the part-bodies may have at least one guide limb on which the in each case other part-body is guided with sliding action. The above-described measures make it possible for the first and second part-bodies to be guided securely along the axial direction of the discharge protection valve, such that reliable closing action for preventing discharge of a residual quantity of fluid and a reliable opening movement upon opening of the main valve are ensured.

In a preferred embodiment, one of the part-bodies is configured such that, during a movement in the direction of the closed position, it carries the other one of the part-bodies along into the closed position. In particular, the second part-body may be configured such that, during a movement in the direction of the closed position, it carries the first part-body along into the closed position. The carrying-along of the first part-body is in this case preferably realized by a transmission of force from the sealing surface of the second part-body to the counterpart sealing surface of the first part-body. This configuration has the advantage that it suffices for the second part-body to be moved actively into the closed position. The first part-body is then carried along without the need for an additional restoring element. The filling nozzle may, for this purpose, have a mechanical restoring element, for example a spring element, which is configured to force the second part-body into the closed position.

In an advantageous embodiment, the second part-body comprises a magnetic material, wherein provision is made of a counterpart magnet body which is arranged upstream of the second part-body and which is configured to hold the first and second part-bodies in the closed position of the discharge protection valve by way of magnetic interaction. The magnetic material may be a material which is attracted by a pole of an external magnetic field. In particular, the magnetic material may be a ferromagnetic material. The counterpart magnet body may be a permanent magnet. It is also possible that the magnetic material is in the form of a permanent magnet, and the counterpart magnet body is formed from a material which is attracted by a pole of an external magnetic field. Preferably, the first part-body is formed from a non-magnetic material. It is furthermore preferable for housing portions surrounding the magnetic material and the counterpart magnet body and/or for a discharge pipe of the filling nozzle to also be formed from a non-magnetic material. If the elements surrounding the magnetic material and the counterpart magnet body are formed from a non-magnetic material, the magnetic interaction between the magnetic material and the counterpart magnet body will not be disturbed.

Preferably, the second part-body has a maximum open position which is situated outside an effective range of the counterpart magnet body, with the result that, after a fluid-dispensing process has ended, the second part-body remains in an open position, wherein, through utilization of gravitational force, the second part-body is able to be moved back into the effective range, within which said second part-body is drawn into the closed position by the counterpart magnet body if the filling nozzle is inclined upwardly on the discharge side. An angle of inclination of the axial direction of the discharge protection valve relative to the vertical may be between 0° and 110°, preferably between 0° and 90°, more preferably between 0° and 70°, for example during the dispensing of fluid, where an angle of 0° means an orientation in flow direction vertically downwards. If, during a fluid-dispensing process, the second part-body assumes the maximum open position, owing to this configuration, it remains in the open position after the fluid-dispensing process has ended, without the occurrence of an automatic movement, caused by the magnetic force, of the second part-body in the direction of the closed position. This means, for example with the fueling of a motor vehicle, during which an outlet-side end of the filling nozzle is inserted into a filler neck in a downwardly inclined manner, that residual quantities of fluid remaining within the filling nozzle can initially still run out into the tank. This prevents residual quantities of fluid that have already passed through the main valve remaining in volumes of the filling nozzle downstream of the main valve, and consequently the quantity of fluid recorded by a calibrated fluid quantity meter deviating in a manner relevant to calibration laws from the quantity of fluid actually dispensed.

Only when the filling nozzle is lifted on the discharge side, for example such that the axial direction of the drip protection valve assumes an angle to the vertical of between 95° and 180°, preferably between 95° and 160°, more preferably between 95° and 140°, can the second part-body (through easing of the downward gradient force acting towards the outlet end or through action of a downward gradient force directed towards the inlet end) pass back into the effective range of the counterpart magnet body, within which said second part-body is drawn into the closed position while carrying along the first part-body. Such a lifting action normally occurs anyway when taking the filling nozzle out of a filler neck, so that, in this respect, reliable closure of the discharge protection valve is ensured.

In an advantageous embodiment, the discharge protection valve is arranged on an inlet end of a discharge pipe of the filling nozzle. In the context of the invention, it has been recognized that, in particular for fluids with low viscosity, only small quantities of fluid remain in the discharge pipe, so that an arrangement on the inlet end of the discharge pipe is sufficient both from the aspect of calibration laws and with regard to effective drip protection. At the same time, it has been found that more structural space is available for the discharge protection valve at the inlet end of the discharge pipe, and the arrangement at the inlet end can therefore be realized more easily in terms of design.

The invention also relates to a filling nozzle for dispensing a fluid, comprising an inlet opening for connection to a fluid feed line, an outlet end situated opposite the inlet opening and a main valve for controlling the fluid flow through the filling nozzle. The filling nozzle comprises a sensor line which extends as far as the outlet end and which is operatively connected to an automatic deactivation device, wherein, during the dispensing of fluid, the sensor line is subjected to a vacuum such that a gas stream is able to be sucked in via the end of the sensor line.

Such automatic deactivation devices, which bring about automatic closure of the main valve if a liquid level reaches or rises above the end region of the sensor line, are basically known from the prior art (see for example EP 2 386 520 A1). However, the prior art has hitherto completely disregarded the fact that, with conventional sensor lines, owing to the vacuum required for operation of the automatic deactivation device, a certain quantity of fluid enters the sensor line if the liquid level reaches the end of the sensor line. Therefore, in the prior art, the quantity of fluid which entered was then able to run in an uncontrolled manner out of the sensor line again after the dispensing of fluid.

Against this background, it is an object of the present invention to at least partly avoid the above-described disadvantage. This object is achieved with the features of claim 14. Advantageous embodiments are described in claims 15 and 16.

According to the invention, the sensor line has an end region in which a sensor line valve configured to close off the sensor line is arranged, which sensor line valve is movable into an open position by means of the gas stream sucked in through the sensor line.

The sensor line valve according to the invention makes it possible for the sensor line to be closed off and, in this way, for an undesirable discharge of said quantity of fluid to be prevented, it moreover also being possible for the quantity of fluid entering to be reduced slightly. In one embodiment, the sensor line valve may be preloaded into the closed position by a restoring element. As a result of this measure, it is possible for the undesirable discharge of said quantity of fluid to be further reduced. The abovementioned restoring element is preferably dimensioned such that, during the dispensing of the fluid, the sensor line valve is moved into the open position by the gas stream which forms. The functionality of the automatic deactivation device is thus not impaired in any way.

In an advantageous embodiment, the sensor line valve is configured to be moved into the closed position through downward inclination of the filling nozzle on the discharge side (through utilization of gravitational force).

The concept of arranging a sensor line valve as described above in the end region of a sensor line and the more detailed configurations of said concept, which are still to be described below, have inventive content of their own.

In a preferred embodiment, the sensor line valve has a valve seat, and has a valve body which is arranged so as to be movable within the sensor line upstream of the valve seat, such that the valve body is movable into the valve seat through downward inclination of the filling nozzle on the discharge side and is movable out of the valve seat through upward inclination of the filling nozzle on the discharge side. The valve body may for example be of spherical form. By way of this configuration, it is possible to realize the sensor line valve in the sensor line in a particularly simple and thus inexpensive manner.

During the fueling, the valve body is moved out of the valve seat (possibly counter to gravitational force) owing to the vacuum. As soon as the liquid level reaches the end region of the sensor line, automatic deactivation occurs, gas no longer being sucked in and, as a result, the valve body dropping back into the valve seat. During the time required for the deactivation process, small quantities of the fluid can pass into the sensor line. If the end of the filling nozzle is subsequently inclined upwardly, for example when the filling nozzle is put into a filling pump, the valve body drops out of the valve, so that the sensor line is opened and a residual quantity of fluid possibly present can evaporate.

The invention furthermore relates to a discharge pipe for a filling nozzle for dispensing a fluid, comprising an inlet end connectable to a housing of the filling nozzle, an outlet end situated opposite the inlet end, and a discharge protection valve having a valve seat and having a valve body which is movable upstream into a closed position, characterized in that the valve body has a first part-body and a second part-body, which is configured to be movable relative to the first one, wherein, by way of a downstream-directed movement of the first part-body relative to the valve seat of the discharge protection valve, a first fluid path is able to be opened up, and wherein, by way of a downstream-directed movement of the second part-body relative to the first part-body, a second fluid path is able to be opened up, wherein the discharge protection valve is preferably arranged on the inlet end of the discharge pipe.

The discharge pipe according to the invention can be developed by further features which have already been described in connection with the filling nozzle according to the invention.

Advantageous embodiments are discussed by way of example below with reference to the appended drawings. In the drawings.

Figure 1:
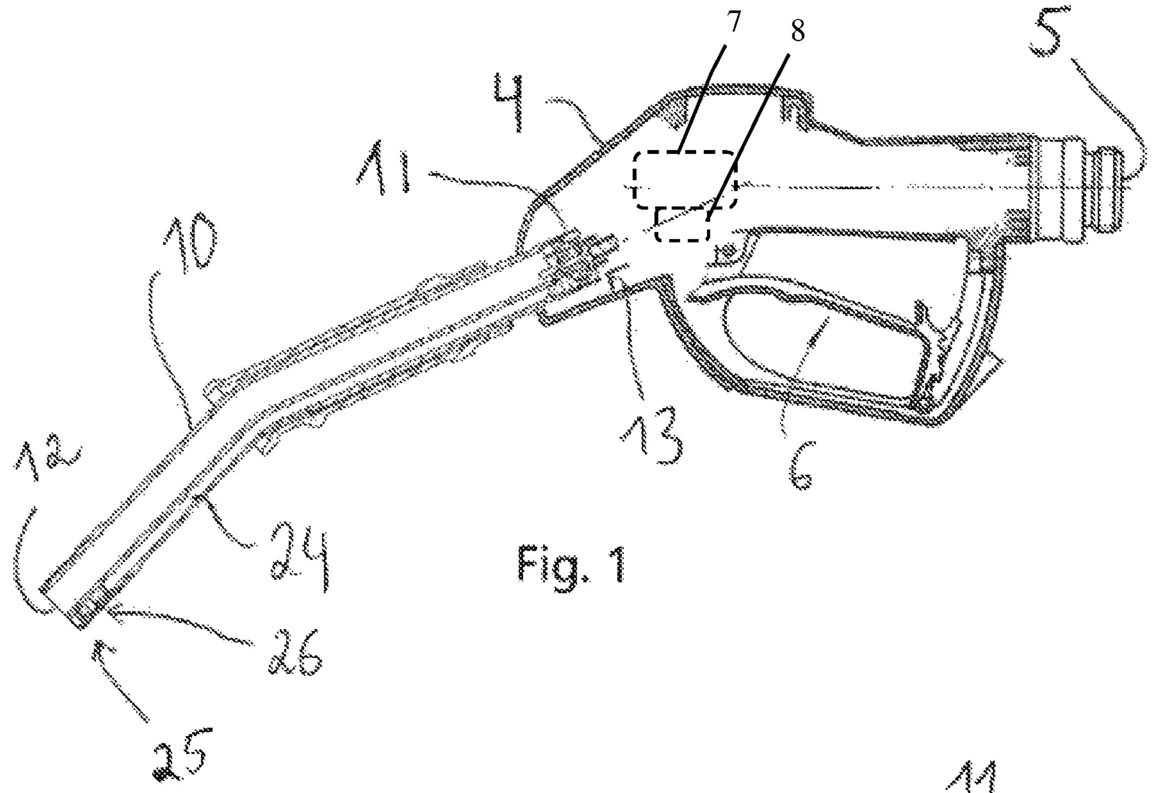
FIG. 1 shows a filling nozzle according to the invention in a cross-sectional view.

FIG. 1 shows a filling nozzle according to the invention in a lateral sectional view. The filling nozzle comprises a housing 4 (shown merely schematically in FIG. 1), which has an inlet opening 5 for connection to a liquid feed line. A discharge pipe 10 is inserted at the front end of the housing 4, at the front end of which discharge pipe there is an outlet opening 12. Also at the housing 4, a control lever 6 by which a main valve 7 can be actuated is pivotably mounted. The throughflow of a liquid fed via the inlet opening is controlled by the filling nozzle via the main valve. Also situated within the filling nozzle is an automatic deactivation device 8, which closes off the main valve if, during a tank-filling process, a liquid level reaches or rises above the front end of the discharge pipe. For this purpose, the discharge pipe has a sensor line 24 which is led from the discharge end 12 as far as the automatic deactivation device.

Figure 2:
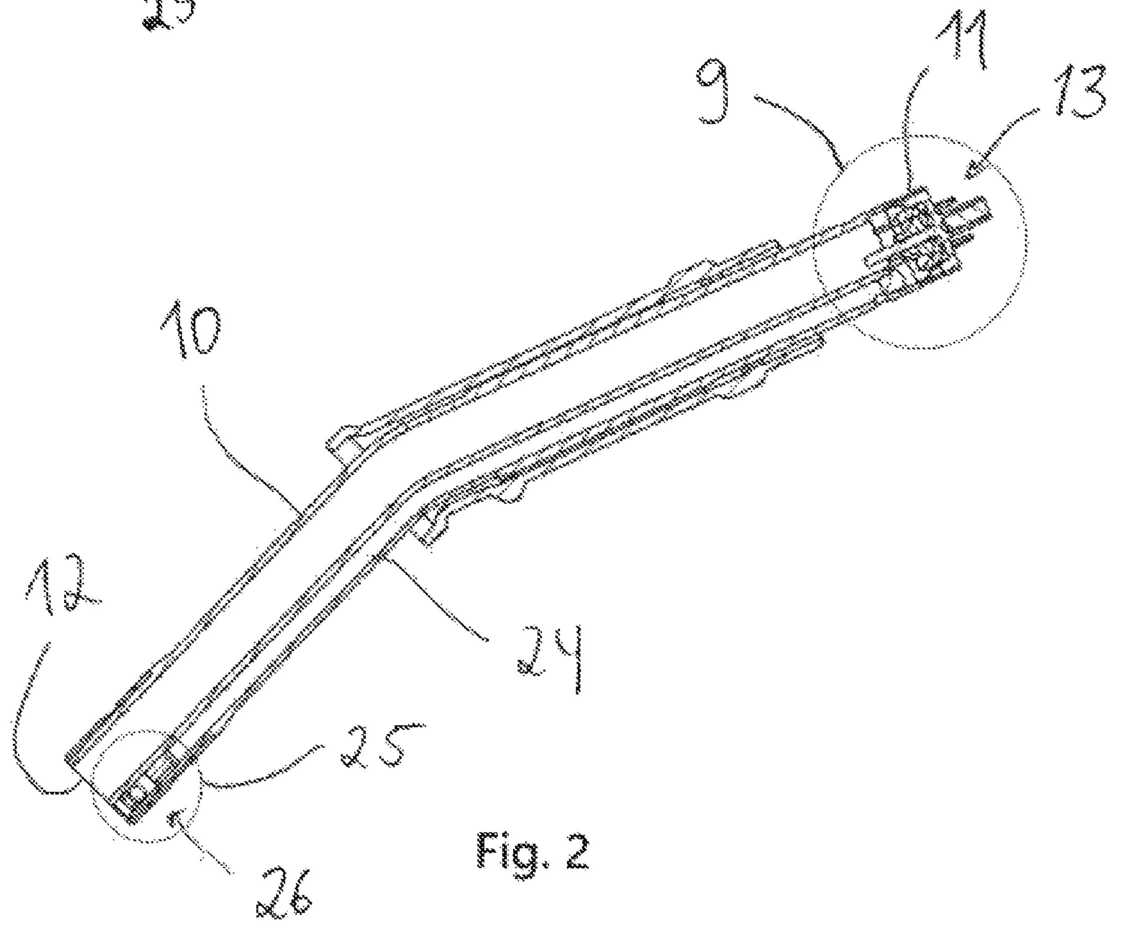
FIG. 2 shows the discharge pipe according to the invention of the filling nozzle in FIG. 1 in an enlarged view.

FIG. 2 shows an enlarged lateral sectional view of the discharge pipe 10 in FIG. 1. In this view, it can be seen that a discharge protection valve 13 according to the invention is arranged on the inlet end 11 of the discharge pipe 10 (in the region 9). Moreover, it can be seen that a sensor line valve 26 is situated in an end region 25 of the sensor line 24. The figures shown below show enlarged views of the regions 9 and 25, on the basis of which the functioning of the discharge protection valve 13 and of the sensor line valve 26 will be explained in more detail.

Figure 3:
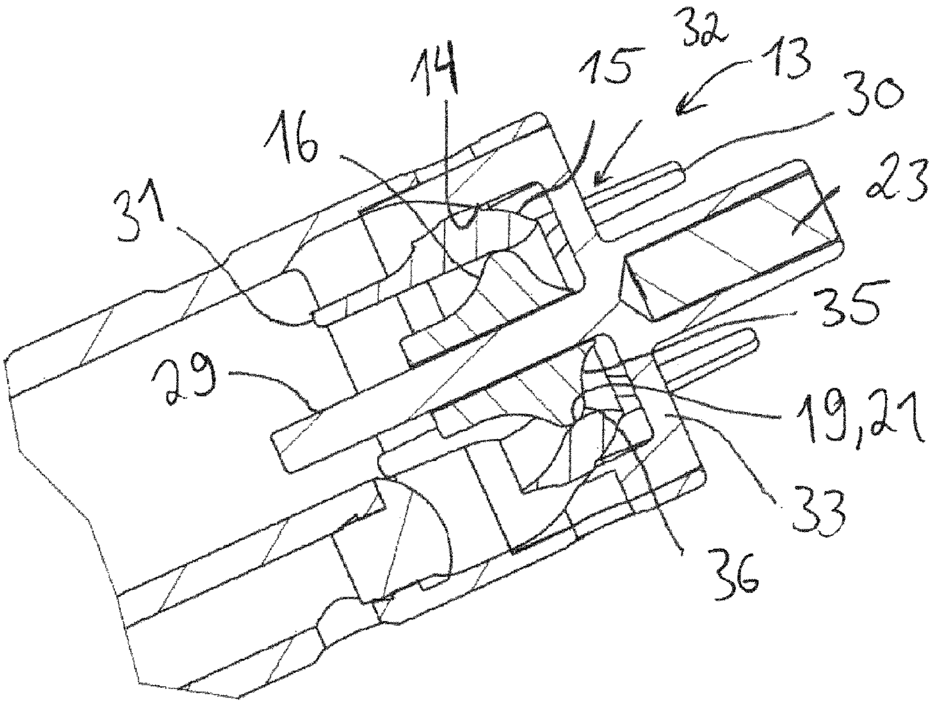
FIG. 3 shows an enlarged view of the discharge protection valve shown in FIG. 2 in a closed position.

FIG. 3 shows an enlarged view of the region 9 shown in FIG. 2, in which a discharge protection valve 13 is arranged. FIG. 3 shows the discharge protection valve 13 in a closed position. The discharge protection valve 13 comprises a valve seat 14 and a valve body which is configured to close off the valve seat 14 and which has a first part-body 15 and has a second part-body 16. In the closed position shown, the first part-body 15 bears sealingly against the valve seat 14. Within the first part-body 15, there is a cutout into which the second part-body 16 is inserted. The first part-body 15 thereby radially completely surrounds the second part-body 16. In the closed position shown, a sealing surface 21 of the second part-body 16 bears sealingly against a counterpart sealing surface 19 of the first part-body 15. The first part-body 15 thereby forms a valve seat (or part-body valve seat) for the second part-body 16. In the state shown in FIG. 3, the drip protection valve is completely closed, and so possibly present residual quantities of liquid cannot exit the filling nozzle.

Connected rigidly to the valve seat 14 is a central shank 29 which extends in an axial direction of the discharge protection valve and on which the second part-body 16 is guided with sliding action. The second part-body 16 has for this purpose a central passage bore through which the shank 29 is guided. The shank 29 defines an axial direction of the discharge protection valve.

Also connected rigidly to the valve seat 14 is a registration plate 33 with registration openings 32. The first part-body 15 comprises at its inlet-side end four guide limbs 30, of which merely two are illustrated, in the manner of a side view, in the sectional view in FIG. 3. The section plane in FIG. 3 does not run through the guide limbs 30. The guide limbs 30 are guided with sliding action through in each case one of the registration openings 32. In this way, the first part-body 15 is guided linearly at its inlet-side end. At its rear end, the first part-body 15 comprises three guide webs 31. Said guide webs are configured to bear slidingly against an outer surface of the second part-body 16 when the second part-body 16 is moved downstream relative to the first part-body 15. The guidance of the part-bodies 15, 16 will also be explained in more detail on the basis of FIGS. 5 to 7.

In the present case, the second part-body 16 is formed from a magnetic material: Moreover, a counterpart magnet body 23 is connected to the valve seat 14. The counterpart magnet body 23 is arranged symmetrically with respect to the axial direction predefined by the shank 29, whereby a uniform magnetic force of attraction is exerted on the second part-body 16. By way of said force of attraction, the part-body 16 is held in the closed position. At the same time, the part-body 16, owing to the abutment of the sealing surface 21 of the second part-body 16 against the counterpart sealing surface 19 of the first part-body 15, transmits a force to the first part-body. 15, which is consequently likewise pushed into the closed position. An action of force for moving the second part-body into the closed position can, in alternative embodiments, also be generated by other devices, for example by means of a mechanical restoring element, in particular by means of a spring element.

Figure 4:
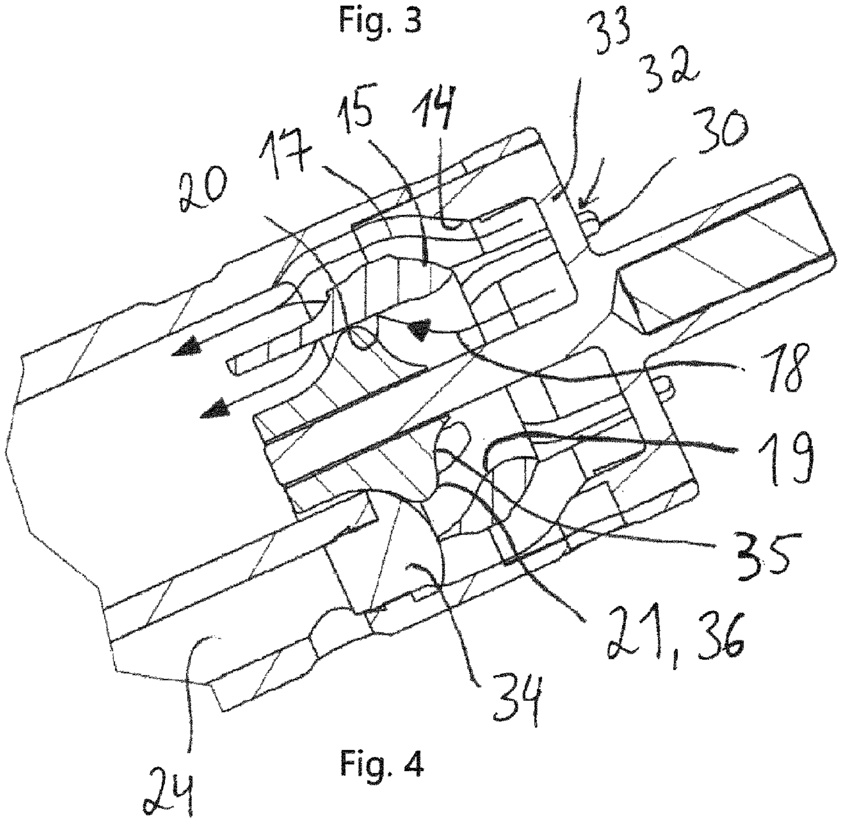
FIG. 4 shows an enlarged view of the discharge protection valve shown in FIG. 2 in an open position.

FIG. 4 shows the discharge protection valve 13 in an open position. A transition from the closed position, shown in FIG. 3, into the open position may be realized in particular by opening of the main valve and a liquid stream passing through the main valve. Here, the liquid stream impinges on the inlet-side front surfaces of the first and second part-bodies 15, 16 and, there, generates an opening pressure which is sufficient for overcoming the magnetic force acting between the counterpart magnet body 23 and the second part-body 16 and for moving both the first part-body 15 and the second part-body 16 downstream.

In FIG. 4, it can be seen that, in comparison with the closed position shown in FIG. 3, firstly, the first part-body 15 has been moved downstream in relation to the valve seat 14 and, secondly, the second part-body 16 has been moved downstream in relation to the first part-body 15. The movement of the first part-body 15 relative to the valve seat 14 results in a first fluid path 17 being opened up. The movement of the second part-body 16 relative to the first one results in a second fluid path 18 being opened up. The liquid stream impinging on the discharge protection valve 13 can thus flow either along the first fluid path 17, which runs between an outer surface of the first part-body 15 and the valve seat 14, or along the second fluid path 18, which firstly passes the second part-body 16 at the outside and the first part-body 15 at the inside and then runs through a passage opening 20 in the first part-body 15. The first fluid path 17 is merged with the second fluid path 18 behind the passage opening. By way of the additional, second fluid path 18, the throughput through the discharge protection valve can be increased and the back pressure before the valve can be reduced.

In alternative embodiments, it is possible for provision to be made of further fluid paths which are able to be opened up by way of a downstream-directed movement of the first part-body 15 relative to the valve seat 14 and/or by way of a downstream-directed movement of the second part-body 16 relative to the first part body 15.

Furthermore, in the context of the invention, a further fluid path, which runs through an intermediate space between an outer surface of the shank 29 and an inner surface of the central passage bore of the second part-body 16 and which is constantly open irrespective of the position of the part-bodies 15, 16, may be present. Such an intermediate space between the outer surface of the shank 29 and the inner surface of the central passage bore may be necessary to allow sufficient mobility of the part-body 16 relative to the shaft 29. In a preferred embodiment, the radial spacing between the outer surface of the shank 29 and the inner surface of the central passage bore is however so small that the capillary forces acting on the fluid in the intermediate space are already sufficient to greatly reduce, and preferably to completely prevent, discharge of the fluid through said intermediate space.

In FIGS. 3 and 4, it can be seen that the second part-body 16, proceeding from the sealing surface 21, narrows in cross section in the upstream direction. In the region of the narrowing, the outer surface of the second part-body 16 is outwardly bulged in a first portion 36 and is inwardly bulged in a second portion 35, which is arranged upstream of said first portion. Due to the bulges in the region of the portions 35, 36, the liquid flowing along the second fluid path 18 is guided in a flow-optimized manner in the direction of the passage opening 20.

In FIG. 4, the first and second part-bodies are in a maximum open position, in which the part-bodies 15, 16 butt against a stop which limits the downstream-directed mobility of the part-bodies 15, 16. Here, by way of example, the stop is formed by a sensor line plug 34, which is mounted on one end of the sensor line 24, wherein the stop (s) may of course also be realized in some other way. The second part-body remains in this maximum open position even after the dispensing of liquid, for example after the main valve has been closed. The second part-body 16 is, in this respect, situated outside an effective range of the counterpart magnet body. Consequently, the sum of the gravitational force, which acts downstream in the position shown, and friction forces caused by the sliding guidance of the part-bodies is, in the position shown, larger than the magnetic force of attraction between the second part-body 16 and the counterpart magnet body 23. Residual quantities of liquid present in the filling nozzle downstream of the main valve can thus run out through the still open discharge protection valve 13.

Only when the filling nozzle (and thus the axial direction of the discharge protection valve 13) is inclined upwardly on the discharge side can the force ratio be inverted such that the magnetic force is sufficient for moving the second part-body 16 into the closed position. In this case, the sealing surface 21 of the second part-body 16 comes into contact with the counterpart sealing surface 19 of the first part-body 15 and, in this way, transmits a force to the first part-body 15, which is consequently carried along into the closed position. The aforementioned change in inclination, which leads to closure of the discharge protection valve, may be realized for example when a user takes the filling nozzle out of a filler neck and then puts it into a filling pump. As a result of the closure of the discharge protection valve, the discharge of residual quantities of the liquid is reliably prevented.

If, instead of the magnetic interaction between the second valve body 16 and the counterpart magnet body, provision is made of a mechanical restoring element which forces the second valve body into the closed position, it may be provided in this case too that the above-described force ratio is able to be inverted with the aid of the inclination of the filling nozzle.

Figure 7:
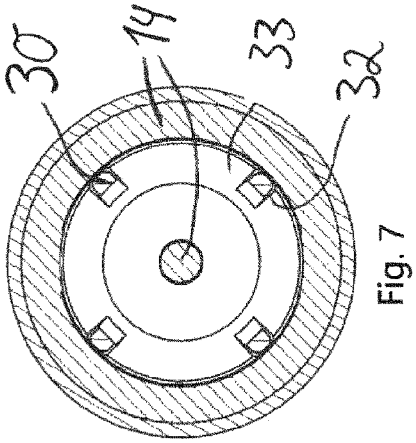
FIG. 7 shows a sectional view along the line B-B shown in FIG. 5.
Figure 6:
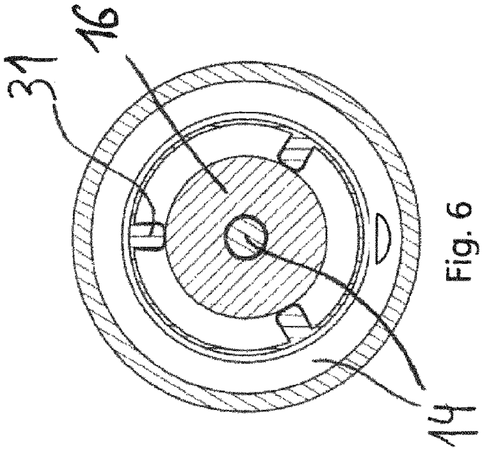
FIG. 6 shows a sectional view along the line A-A shown in FIG. 5.
Figure 5:
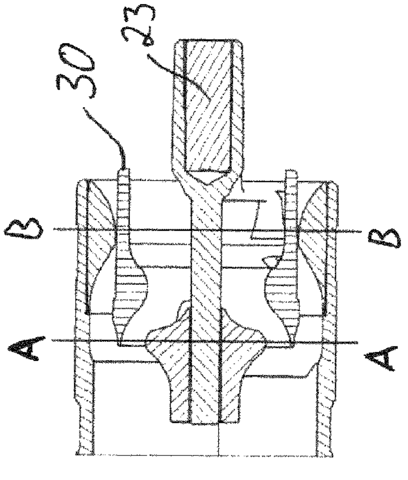
FIG. 5 shows a further cross-sectional view of the discharge protection valve of the filling nozzle according to the invention.

FIG. 5 shows a further cross-sectional view of the region 9 shown in FIG. 2, wherein, in comparison with FIGS. 3 and 4, a different section plane has been selected. In FIG. 5, the section plane extends through two guide webs 30 situated opposite one another in a transverse direction. The outlet-side guide webs 31 cannot be seen in this view. Two section lines A-A and B-B are shown in FIG. 5. FIG. 6 shows a sectional view along the section line A-A, and FIG. 7 shows a sectional view along the line B-B. For purposes of illustration, FIGS. 6 and 7 show, in the manner of a top view, further elements, which cannot actually be seen in the sectional view.

It can be seen in FIG. 6 that the guide webs 31 of the first part-body 15 bear, in the valve position shown in FIG. 5, against the outer circumference of the second part-body 16. The part-bodies 15, 16 are in this way guided on one another and stabilized relative to one another. In FIG. 7, it can be seen that the four inlet-side guide limbs 30 of the first part-body 15 are guided with sliding action through the registration openings 32. The registration openings 32 extend through the registration plate 33, which is connected to the valve seat 14.

Figure 10:
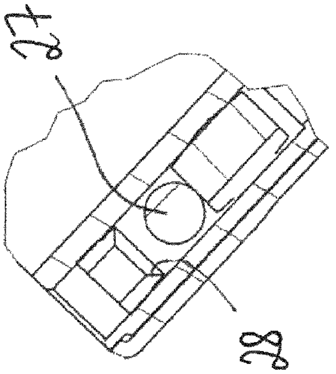
FIG. 10 shows an enlarged view of the sensor line valve shown in FIG. 2 in an open position with an upwardly inclined discharge pipe.
Figure 9:
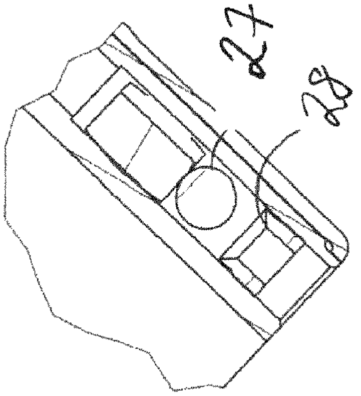
FIG. 9 shows an enlarged view of the sensor line valve shown in FIG. 2 in an open position with a downwardly inclined discharge pipe during the dispensing of fluid.
Figure 8:
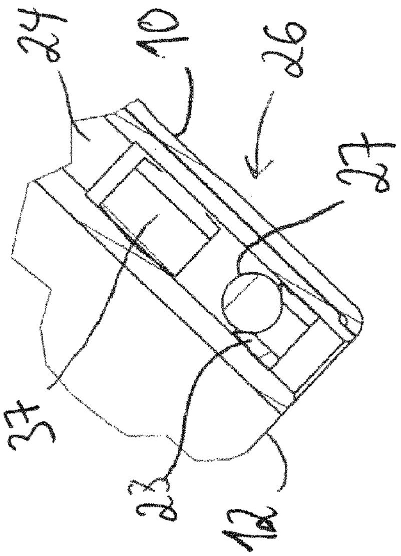
FIG. 8 shows an enlarged view of the sensor line valve shown in FIG. 2 in a closed position.

FIGS. 8 to 10 show enlarged views of the region 25 shown in FIG. 2, in which a sensor line valve 26 is arranged on the end of the sensor line 24. The sensor line valve 26 comprises a valve body 27 which is movable within the sensor line 24 and which, in the present case, is, by way of example, in the form of a ball. The sensor line valve moreover comprises a valve seat 28. Situated upstream of the valve seat 28 is a blocking element 37 which limits the mobility of the valve body 27, said blocking element not however preventing an exchange of gas through the sensor line 24. The valve body 27 is movable between the valve seat 28 and the blocking element 37.

In the state shown in FIG. 8, the valve body 27 is situated within the valve seat 28 and thus closes off the sensor line 24. The valve body 27 is held in the valve seat 28 owing to the inclination, directed downwardly on the discharge side, of the sensor line 24. The main valve of the filling nozzle is closed in the state shown, and no dispensing of liquid takes place.

After the main valve is opened, a vacuum is generated within the sensor line 24, and air is sucked in through the sensor line 24, in a manner known in the prior art. The gas stream is suitable for lifting the valve body 27 out of the valve seat 28 counter to the gravitational force. The valve body 27 is consequently pushed against the blocking element 37. This state is shown in FIG. 9.

If a liquid level reaches the outlet end 12 of the discharge pipe 10, automatic deactivation occurs, gas no longer being sucked in and, as a result, the valve body dropping back into the valve seat.

After liquid has been dispensed, the filling nozzle is normally taken out of a filler neck and, for example, put into a filling pump. In this way, the filling nozzle and the discharge pipe 10 are inclined upwardly on the discharge side. Here, owing to gravitational force, the valve body 27 drops out of the valve seat 28, with the result that residual quantities of liquid possibly present in the sensor line 24 can evaporate.

Figure 11:
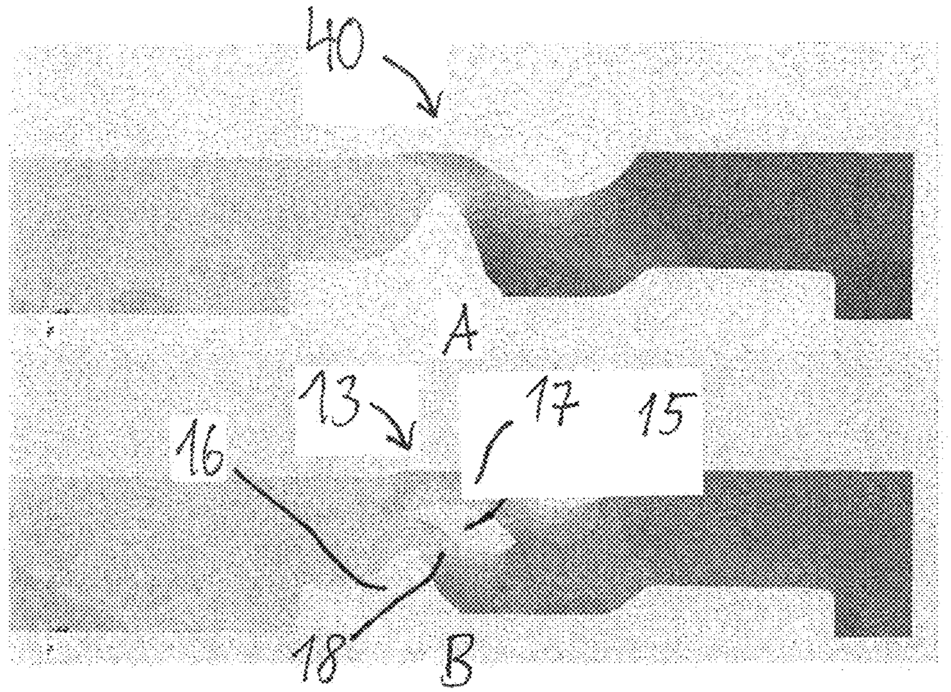
FIG. 11 shows a greyscale plot for illustrating the fluid pressure prevailing within the filling nozzle in the region of the discharge protection valve.

FIG. 11 shows two greyscale plots for illustrating the liquid pressure prevailing within a filling nozzle in the region of a discharge protection valve. Here, a low pressure is indicated by light shades of grey and a higher pressure is indicated by darker shades of grey. The pressure values were obtained through a mathematical simulation. FIG. 11A (top) shows the pressure conditions for a conventional discharge protection valve known from the prior art, which has a one-part valve body which is arranged in the region 40. It can be seen that, before the region 40, a significant increase in pressure occurs.

FIG. 11B shows the pressure conditions within a filling nozzle according to the invention in the region of the discharge protection valve 13. The discharge protection valve 13 and the remaining elements of the filling nozzle are not shown explicitly, but the positions of the respective elements (in particular the first part-body 15 and the second part-body 16) can be identified from a comparison with FIG. 4. The positions are identified in FIG. 11B by the corresponding reference signs. The discharge protection valve 13 is in the open state, in which the part-bodies 15, 16 open up the fluid paths 17 and 18. A comparison of the grey levels in the illustrations A and B shows that a lower back pressure is established before the discharge protection valve 13 according to the invention.

Figure 13:
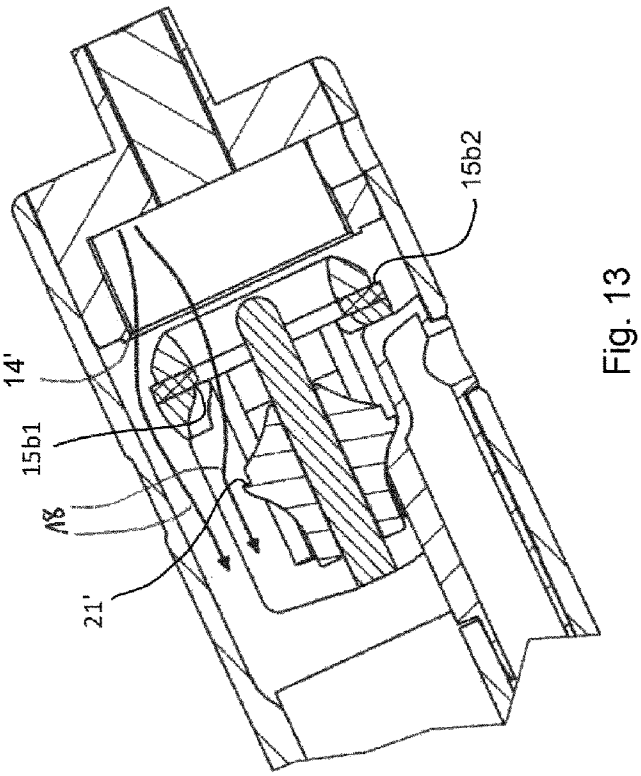
FIG. 13 shows the discharge protection valve in FIG. 12 in an open position.
Figure 12:
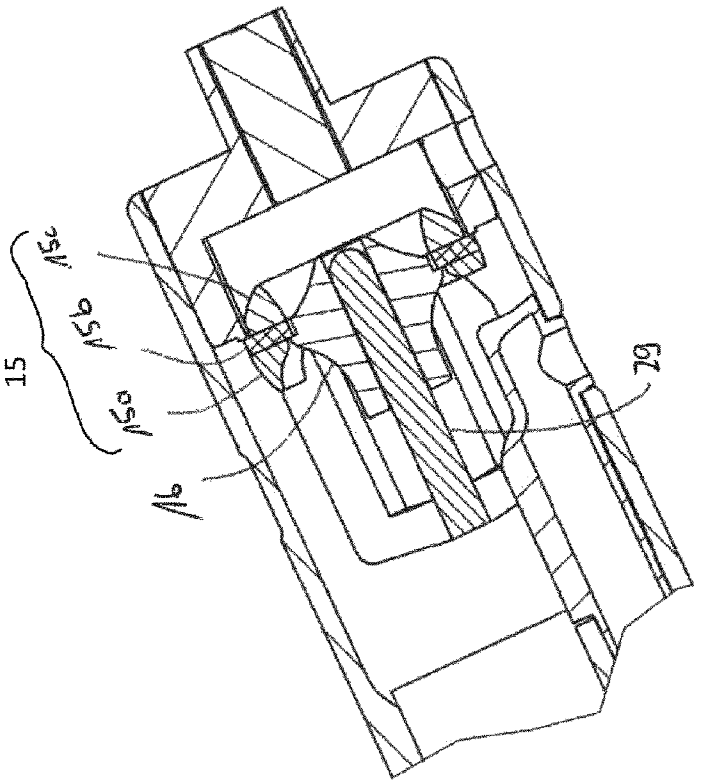
FIG. 12 shows a discharge protection valve of an alternative filling nozzle according to the invention in a lateral sectional view in a closed position.

FIGS. 12 and 13 show a discharge protection valve of an alternative embodiment of a filling nozzle according to the invention in a lateral sectional view. The discharge protection valve is in a closed position in FIG. 12 and is in an open position in FIG. 13.

The alternative embodiment differs from the embodiment in FIGS. 1 to 10 only by the configuration of the discharge protection valve. Therefore, only these differences from the embodiment in FIGS. 1 to 10 will be described below.

In the alternative embodiment in FIGS. 12 and 13, the first part-body 15 comprises a circular-ring-shaped flat-seal element 15*b* and also two part-body elements 15*a* and 15*c*. The part-body element 15*a* is connected to the downstream side of the flat-seal element 15*b* in such a way that a radially inner downstream-facing sealing surface 15*b*1 is exposed, that is to say is not concealed by the part-body element 15*a*. The part-body element 15*c* is connected to the upstream side of the flat-seal element 15*b* in such a way that a radially outer upstream-facing sealing surface 15*b*2 is exposed, that is to say is not concealed by the part-body element 15*c*. The sealing surfaces 15*b*1 and 15*b*2 are oriented approximately perpendicularly to an axial direction of the discharge protection valve.

In this embodiment, the second part-body 16 has an upstream-facing sealing surface 21' which is configured for sealing abutment against the sealing surface 15*b*1. The discharge protection valve moreover has in this embodiment a valve seat 14' which is configured for sealing abutment against the sealing surface 15*b*2.

Due to the upstream-facing and downstream-facing sealing surfaces 15*b*1 and 15*b*2 of the flat-seal element 15*b*, which sealing surfaces are substantially perpendicular to the axial direction of the discharge protection valve, particularly good sealing action between the two part-bodies 15, 16 and between the first part-body 15 and the valve seat 14' can be produced. At the same time, the part-body elements 15*a* and 15*c* serve for reducing, in the open position of the discharge protection valve, the effects of the flat-seal element 15*b* on the liquid stream. In particular, the part-body elements 15*a*, 15*c* guide the liquid stream past the flat-seal element 15*b* in the most advantageous way possible. For this purpose, the part-body elements 15*a*, 15*c* narrow in an axial direction (that is to say in the direction downstream or the direction upstream), wherein the outer surfaces of the part-body elements 15*a*, 15*c* are bulged inwardly or outwardly.

The invention claimed is:

1. Filling nozzle for dispensing a fluid, comprising:
- an inlet opening (5) for connection to a fluid feed line,
- an outlet end (12) situated opposite the inlet opening,
- a main valve for controlling the fluid flow through the filling nozzle, wherein the filling nozzle furthermore has a sensor line (24) which extends as far as the outlet end (12) and which is operatively connected to an automatic deactivation device,
- wherein the filling nozzle creates a vacuum in the sensor line (24) during the dispensing of the fluid such that a gas stream is sucked in via an end region (25) of the sensor line (24),
- wherein a sensor line valve (26) is positioned in the end region (25) and is movable to close off the sensor line (24); and
- wherein the sensor line valve moves into an open position by means of the gas stream sucked in through the sensor line (24).

2. The filling nozzle according to claim 1, in which the sensor line valve (26) is configured to be moved into the closed position through downward inclination of the filling nozzle on a discharge side.

3. The filling nozzle according to claim 2, in which the sensor line valve (26) is configured to be moved into the closed position through utilization of gravitational force.

4. The filling nozzle according to claim 1, in which the sensor line valve (26) is preloaded into the closed position.

5. The filling nozzle according to claim 1, in which the sensor line valve (26) has a valve seat (28), and has a valve body (27) which is arranged so as to be movable within the sensor line (24) upstream of the valve seat (28), such that the valve body (27) is movable into the valve seat (28) through downward inclination of the filling nozzle on a discharge side and is movable out of the valve seat (28) through upward inclination of the filling nozzle on the discharge side.

6. The filling nozzle according to claim 5, wherein the valve body (27) is ball-shaped.

* * * * *